United States Patent [19]

Isozumi

[11] Patent Number: 4,897,571
[45] Date of Patent: Jan. 30, 1990

[54] STARTING ELECTRIC MOTOR
[75] Inventor: Shuzoo Isozumi, Hyogo, Japan
[73] Assignee: Mitsubishi Denki Kabushiki Kaisha, Tokyo, Japan
[21] Appl. No.: 238,431
[22] Filed: Aug. 31, 1988
[30] Foreign Application Priority Data Aug. 31, 1987 [JP] Japan ................. 62-133387
Aug. 31, 1987 [JP] Japan ................. 62-133388
Oct. 6, 1987 [JP] Japan ................. 62-153897

[51] Int. Cl.$^4$ ............................ H02K 13/00
[52] U.S. Cl. ......................... 310/239; 310/89; 310/43
[58] Field of Search ............ 310/43, 89, 71, 239, 310/249

[56] References Cited

U.S. PATENT DOCUMENTS 4,355,253 10/1982 Vollbrecht ............... 310/239
4,538,085 8/1985 Tanaka .................. 310/239
4,673,838 6/1987 Takagi et al. ............ 310/239

FOREIGN PATENT DOCUMENTS 1004274 3/1957 Fed. Rep. of Germany .
1760959 2/1958 Fed. Rep. of Germany .
61-073537 4/1986 Japan .
2075276 11/1981 United Kingdom .

Primary Examiner—Patrick R. Salce
Assistant Examiner—Judson H. Jones
Attorney, Agent, or Firm—Sughrue, Mion, Zinn, Macpeak & Seas

[57] ABSTRACT

A starting electric motor comprising: an armature rotary shaft on which an armature is mounted; a commutator mounted on the rear end portion of the armature rotary shaft; power supplying brushes slidably held on the commutator; brush holders which hold the brushes, respectively; a rear bracket of resin which rotatably supports the armature rotary shaft in association with a front bracket; a yoke having magnetic field means which is fixedly held between the rear bracket and the front bracket; a conducting base of electrically conductive material on which the brush holders are mounted, and which is held between the yoke and the rear bracket; through-bolts inserted into the rear bracket and the front bracket, tightening the yoke and the conducting base together; and metal plates provided between the seats of the through-bolts and the outer surface of the periphery of the rear bracket.

11 Claims, 4 Drawing Sheets

STARTING ELECTRIC MOTOR

BACKGROUND OF THE INVENTION

1. Field of the Invention

This invention relates to an improvement of a starting electric motor having a resin rear bracket.

2. Prior Art

A conventional starting electric motor with a resin rear bracket is shown in FIG. 1.

In FIG. 1, reference numeral 1 designates the armature of a DC motor; 1a, an armature rotary shaft; 1b armature coils; 2, magnets forming magnetic fields; 3, a yoke forming magnetic paths and serving as an outer wall; 4, a commutator having segments in the outer periphery; 5a, a positive brush for rectification; 5b, a negative brush for rectification; 6a, a brush holder holding the positive brush 5l; 7, a lead wire connected between the positive brush 5a and a terminal section of an electromagnetic switch (not shown); 7a, a rubber member insulating the lead wire 7; 8, an insulating plate; and 9, a metal base to which the insulating plate is secured, the metal base 9 being engaged with a rear bracket 10 of resin with bolts 11.

Further in FIG. 1, reference character 6b designates a brush holder holding the negative brush 5b; 12, a lead wire having one end connected to the brush holder 6b and the other end connected to the earth (ground) terminal of a starter (not shown); 13, a bearing fitted on the armature rotary shaft 1a and inserted into the recess of the rear bracket 10; and 14, through-bolts joining the resin bracket 10, the yoke 3, and a front bracket (not shown) together.

The operation of the motor thus constructed will be described. When the electromagnetic switch (not shown) is closed, current is supplied through the lead wire 7 to the positive brush 5a and through the segment in the outer periphery of the commutator 4 to the armature coil 1b and the current is allowed to flow through the segment in the outer periphery of the commutator, the negative brush 5b and the lead wire 12 to the earth terminal of the starter (not shown).

As the current flows in the magnetic field formed by the magnets 2 in the above-described manner, the armature 1 produces torque.

The conventional starting electric motor using the resin rear bracket 10 for the purpose of reducing its weight, being constructed as described above, suffers from the following problems: It is necessary to provide the lead wire 12 on the earth side (hereinafter referred to as "an earth side lead wire 12", when applicable), and the earth terminal. This will make the manufacture of the motor intricate, and the number of components increase. On the other hand, during travel of the vehicle, the motor suffers heat generated by the engine, and the rear end face of the rear bracket 10 locally receives the axial tensions of the through-bolts 14 and the bolts 11. As a result, the rear bracket 10 is deformed; i.e., creeped, and the through-bolts 14 and the bolts 11 are loosened. Also, since the end face of the rear bracket 10 is in the form of a plate of resin, the end face is insufficient in bend resisting strength and in compression resisting strength so that it is difficult to tightly and stably mount the rear bracket 10 on the yoke 3.

SUMMARY OF THE INVENTION

An object of this invention is to eliminate the above-described difficulties accompanying a conventional starting electric motor.

Another object of the invention is to provide a starting electric motor in which it is unnecessary to provide the earth side lead wire and the earth terminal which form a particular earthing circuit.

A further object of this invention is to provide a starting electric motor in which the creep deformation attributing to the heat generated by the engine and to the axial tensions of the through-bolts and the brush holder mounting bolts is prevented.

A still further object of this invention is to provide a starting electric motor in which the rear bracket can be suitably mounted on the yoke with the through-bolts.

In a starting electric motor according to the invention, a conducting base, on which the brush holders are mounted, is fixedly held between the rear bracket of resin and the yoke, and a metal plate is provided between the seat of the through bolt and the rear end face of the rear bracket. Also, a buildup portion is formed on the rear bracket at the parts through which the through-bolt is extended in such a manner that the end of the buildup portion on the side of the yoke is abutted against the conducting base.

Further, according to this invention, a starting electric motor comprises: a yoke which forms a magnetic circuit and serves as the housing of the electric motor; and a cup-shaped resin rear bracket engaged with the rear open end of the yoke and secured to the yoke with through-bolts; a metal having a through-hole at the center into which the commutator of the electric motor is inserted, the metal plate being held between the rear open end of the yoke and the rear bracket; and axial tension receiving parts which is formed along the inside of the cylindrical wall of the rear bracket in such a manner that the axial tension receiving parts are integral with the cylindrical wall, and that each of the axial tension receiving parts has one end which is flush with the end face of the cylindrical wall, and the other end merging with the end wall of the rear bracket, and surrounds the respective through-bolt at least partially in the circumferential direction.

DETAILED DESCRIPTION OF THE PREFERRED EMBODIMENTS

In the starting electric motor of the invention, the conducting base held between the rear bracket and the yoke provides an earth circuit, and no bolt is required for positioning the conducting base, which eliminates the difficulty that the rear bracket is creeped by such a bolt when tightened. Furthermore, the metal plates provided on the rear end face of the rear bracket eliminates the difficulty that the axial tensions of the through-bolts might otherwise act locally on the rear bracket when tightened, and the pressure is exerted on a larger area, i.e., the rear bracket is scarcely stressed. Therefore, the rear bracket is free from the creep deformation even when held at high temperature for a long period. Thus, the starting electric motor of the invention is high in reliability.

On the other hand, the axial tensions of the through-bolts are exerted on the conducting base through the buildup portions of the rear bracket which surround the through-bolts completely or partially. Moreover, the metal plates disperse the axial tensions of the through-bolts. Therefore, when the axial tensions of the through-bolts are applied to the conducting base, as described above, which forms a part of the earth circuit, the buildup portions will not be bent. Thus, the rear bracket is stable against the axial tension, and is prevented from being creeped.

When, in the starting electric motor of the invention, the through-bolts are tightened to secure the resin rear bracket to the rear open end of the yoke, the axial tensions thereof act through the axial tension receiving parts integral with the end wall of the rear bracket on the metal plate, and then on the yoke. The negative brush holder is mounted directly on the metal plate, thus providing an earth circuit extending from the brush holder through the metal plate to the yoke. Accordingly, it is unnecessary to connect the lead wire to the negative brush holder to ground it.

The preferred embodiments of this invention will be described with reference to FIG. 2.

Figure 1:
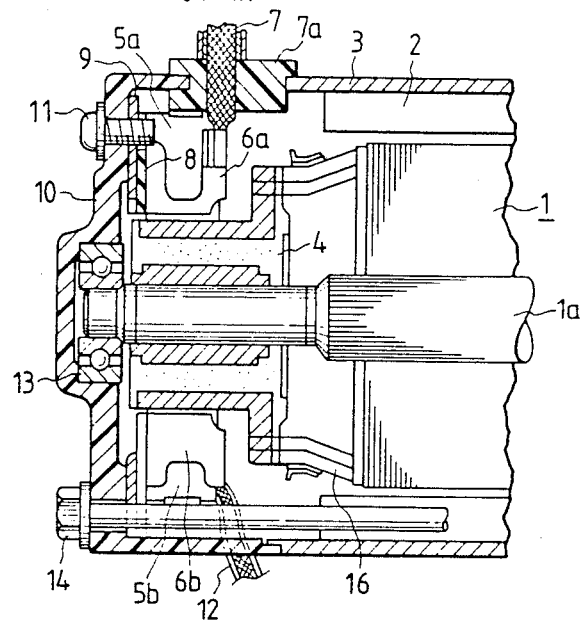
FIG. 1 is a sectional view partially showing a conventional starting electric motor with a resin rear bracket.
Figure 2:
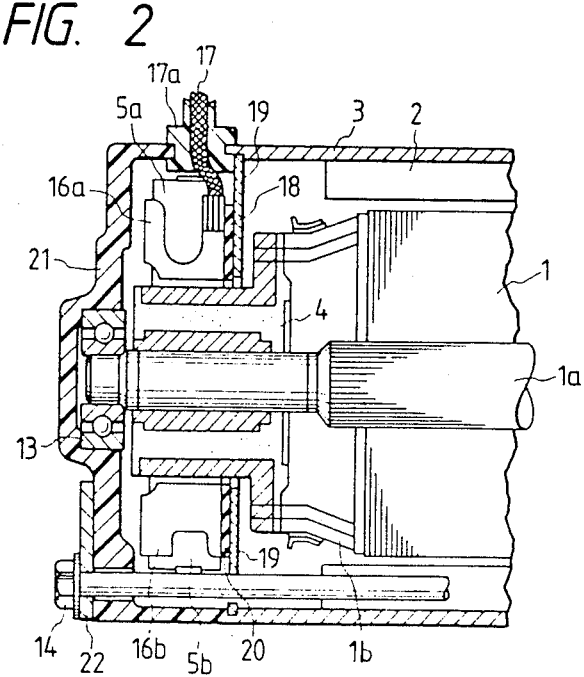
FIG. 2 is a sectional view partially showing a starting electric motor according to one embodiment of this invention.

In FIG. 2, reference numeral 16a designates a brush holder holding a positive brush 5a; 17, a lead wire connected between the positive brush 5a and a terminal of an electro-magnetic switch (not shown); and 17a, a rubber member insulating the lead wire 17. The brush holder 16a is secured through an insulating plate 18 to a conducting base 19 of electrically conducting material. The conducting base 19 is fixedly interposed between a rear bracket 21 of resin and a yoke 3.

Further in FIG. 2, reference character 16b designates a brush holder holding a negative brush 5b, the brush holder 16b being secured directly to the conducting base 19; 13, a bearing mounted on an armature rotary shaft 1a and fitted in the recess of the rear bracket 21; 14, through-bolts which are inserted through metal plates 22 into the rear bracket 21, the conducting base 19, the yoke 3, and a front bracket (not shown) to fixedly join these components together; and 20, a spacer of electrical conductive material, the spacer 20 be interposed between the conducting base 19 and the negative brush holder 16b.

Figure 3A:
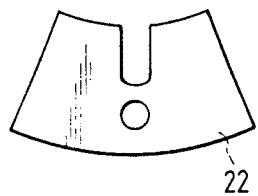
FIG. 3A is a front view of a metal plate employed in the starting electric motor of this invention.
Figure 3B:
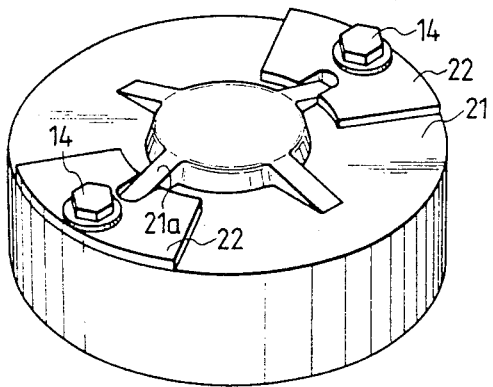
FIG. 3B is a perspective view showing the metal plates mounted on the rear bracket of the motor.

Each of the metal plates 22 is shown in FIG. 3A. The metal plates 22 are engaged with ribs 21a of the rear bracket 21 so that they may not be displaced when the through-bolts 14 are tightened, as shown in FIG. 3B.

It is preferable that the metal plates 22 are formed by using a plate such as a quenched band steel plate so that they may not be deformed by the axial tensions of the through-bolts 14 when tightened.

In the starting electric motor thus constructed, the conducting base 19 is fixedly held between the rear bracket 21 and the yoke 3, as a result of which the negative brush 5b has an earth circuit extending as follows: the negative brush 5b—the spacer 20—the conducting base 19—the yoke 3. Thus, in the starting electric motor of the invention, unlike the conventional one, it is unnecessary to provide the earth side lead wire and to use the bolts or screws for fixing the conducting base 19. Accordingly, the starting electric motor of the invention is free from the difficulty accompanying the conventional starting electric motor that the rear bracket 21 is deformed by the bolts adapted to fixedly secure the brush holder mounting base. Furthermore, in the motor of the invention, the metal plates 22 are provided between the rear end face of the rear bracket 21 and the seats of the bolts 14, and therefore the tightening forces, in the axial direction, of the through-bolts 14 will not be locally applied to the rear end face of the rear bracket 21, and the rear bracket 21 will not be creeped even if held at high temperature for a long period of time.

Furthermore, in the motor of the invention, the ribs 21a are formed on the rear end face of the rear bracket 21, while the metal plates 22 have slits which are engageable with the ribs 21a. Therefore, the metal plates 22 will never be displaced during the tightening of the through-bolts 14. That is, the motor can be assembled readily as much.

In the above-described embodiment, the permanent magnets 2 are used for generation of magnetic fields; however, coils wound on iron cores may be used instead of the permanent magnets.

Figure 4:
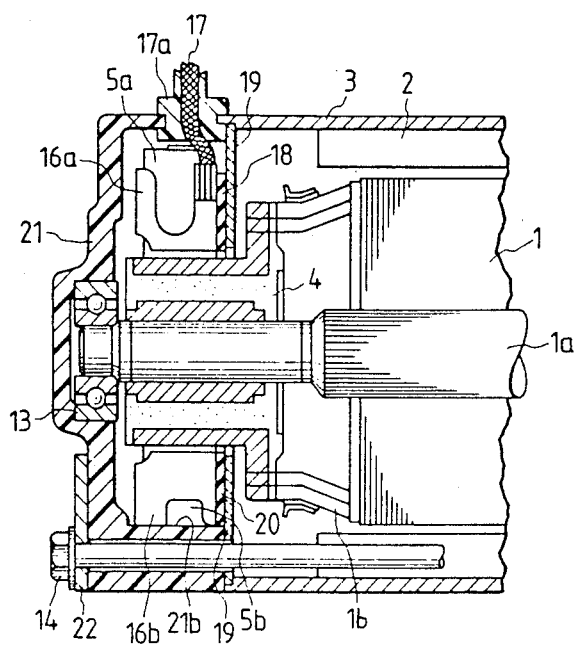
FIG. 4 is a sectional view partially showing a starting electric motor according to another embodiment of this invention.

In another embodiment shown in FIG. 4, buildup portions 21a of the rear bracket are so formed as to cover the through-bolts 14. The end faces of the buildup portions 21b are abutted against the conducting base 19.

Figure 5A:
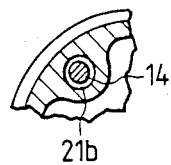
FIG. 5A and 5B are sectional views showing a buildup portion of the rear bracket in FIG. 4, respectively.
Figure 5B:
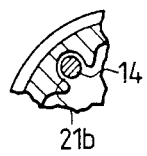

FIG. 5A and FIG. 5B are sectional views showing the buildup portion 21 as viewed from the yoke 3. The buildup portion 21b shown in FIG. 5A is so formed that it completely surrounds the through-bolt 14, and the buildup portion 21b in FIG. 5B is so formed that it partially surrounds the through-bolt 14.

In the starting electric motor of the invention as described above, the rear bracket 21 has the buildup portions 21b through which the through-bolts 14 are extended. Each of the buildup portions 21b is so formed that it completely or partially surround the through-bolt 14, and its end face, on the side of the yoke 3, is abutted against the conducting base 19. Therefore, during the tightening of the through-bolts 14, the axial tensions of the through-bolts act on the rear bracket 21 to compress the latter, and the resulting pressure is exerted on the conducting base 19. Thus, the axial tensions of the through-bolts 14 acting on the rear bracket are further dispersed; that is, the creep resisting strength and the mechanical strength of the rear bracket 21 is increased as much.

In this embodiment, the metal plates 22 may be included in the rear bracket 21 when the latter is molded.

This method will result in a reduction of the number of components and in a reduction of the number of assembling steps.

Figure 6:
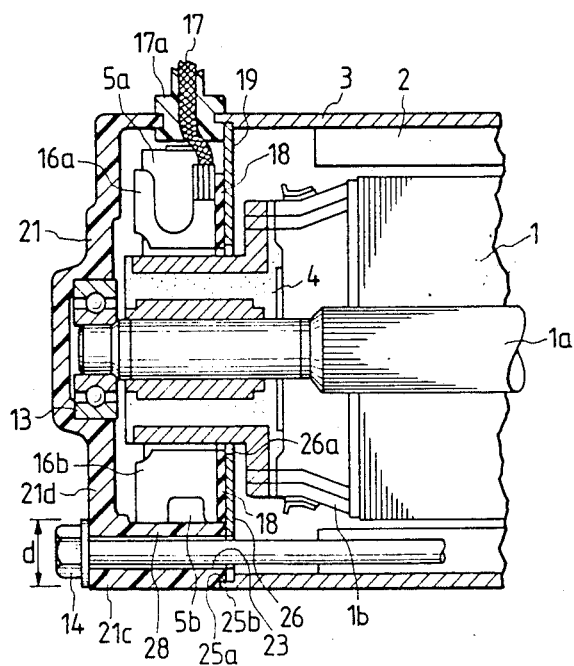
FIG. 6 is a sectional view partially showing a starting electric motor according to a further embodiment of this invention.
Figure 7:
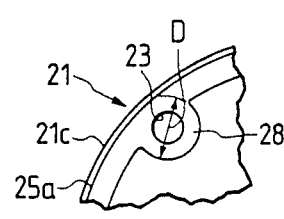
FIGS. 7 and 8 are side views showing a part of an axial tension receiving part forming a part of a rear bracket in the starting electric motor shown in FIG. 6, respectively.

In a starting electric motor shown in FIG. 6, the resin rear bracket 21 of a cup-shape has, as shown in FIG. 7, at least two cylindrical axial tension receiving parts 28 which is formed integral with the rear bracket 21 in such a manner that the axial tension receiving parts 28 are extended along a cylindrical wall 21c of the rear bracket in the axial direction. The front end faces of the axial tension receiving parts 28 are flat surfaces which are flush with the open end of the cylindrical wall 21c, and the rear ends thereof merge with an end wall 21d of the rear bracket 21. A bolt insert hole 23 is formed in each of the axial tension receiving parts 28 at the center, in such a manner that it penetrates the axial tension receiving parts 28 from the end wall 21d.

The cylindrical wall 21c of the rear bracket 21 has an in-low part 25a at the open end thereof. The in-low part 25a is engaged with a mating in-low part 25b provided at the rear open end of the yoke 3, when the rear bracket 21 is engaged with yoke 3. In this engaging operation, a disk-shaped metal plate 26 is interposed between the in-low parts 25a and 25b. The disk-shaped metal plate 26 has an opening 26a at the center into which the commutator 4 is inserted. As the metal plate 26 is held between the engaging parts of the rear bracket 21 and the yoke 3 in this manner, the front end faces of the axial tension receiving parts 28 of the rear bracket 21 is brought into close contact with the metal plate 26. The brush holders 16a and 16b are mounted on the metal plate 26. In this connection, it should be noted that the positive brush holder 16a is mounted through an insulating member 18 on the metal plate 26. That is, for the negative brush 5b, an earth circuit extending from the negative brush holder 16b through the metal plate 26 to the yoke is provided. Thus, in the DC motor, unlike the conventional one, it is unnecessary to connect the negative brush holder to the earth terminal with the lead wire.

In the starting electric motor, the resin rear bracket 21 is engaged with the rear open end of the yoke 3 through the metal plate 26 on which the brush holders 16a and 16b are mounted. Under this condition, the front threaded parts of the through-bolts 14, which are inserted into the end wall 21c of the rear bracket 21, are inserted into a front bracket (not shown) and tightened with nuts, so that the rear bracket is fixedly secured to the yoke. In this operation, the axial tensions of the through-bolts 14 act through the axial tension receiving parts 28 on the metal plate 26 and, then on the yoke 3. Accordingly, the rear bracket 21 is never deformed or bent by the axial tensions of the through-bolts 14, so that the rear bracket 21 is rigidly and tightly secured to the yoke 3. In order to make the axial tension receiving parts 28 strong enough to withstand the axial tensions, it is preferable that the outside diameter D of the axial tension receiving parts 28 is larger than the diameter d of the seats of the heads of the through-bolts 14.

Figure 8:
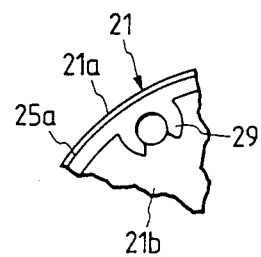

In the starting electric motor as described above, the axial tension receiving parts 28 are in the form of a cylinder. The axial tension receiving parts may be modified as shown in FIG. 8; that is, axial tension receiving parts 29 C-shaped in section may be employed, providing the same effect.

Figure 9:
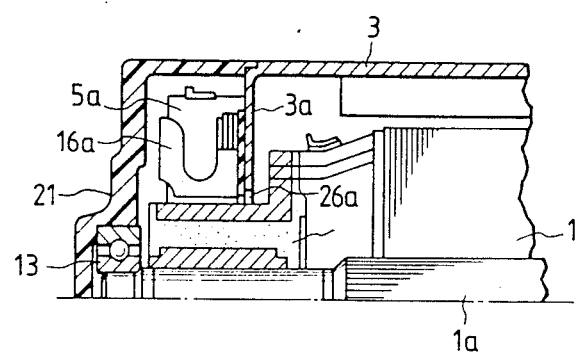
FIG. 9 is a sectional view partially showing a starting electric motor according to a further embodiment of this invention.

Furthermore, in the above-described starting electric motor, the metal plate 26 is not a part of the yoke 3. Therefore, if a part of the yoke is bent to provide the metal plate 3a as shown in FIG. 9, then the number of components can be decreased as much.

As was described above, in the starting electric motor of the invention, with the brush-holder mounting conducting base held between the rear bracket and the yoke, and with the metal plates provided on the rear end face of the rear bracket, the metal plates, the rear bracket, the conducting base, and the yoke are tightened against the front bracket with the through-bolts, with the result that the current path on the earth side extending from the conducting base to the yoke is formed. Therefore, in the motor of the invention, it is unnecessary to provide the particular earth circuit. Furthermore, the metal plates provided on the rear end face of the rear bracket decentralize the axial tensions of the through-bolts which, in the conventional starting electric motor, are centralized at the rear bracket; that is, the stress of the rear bracket is released. Therefore, the rear bracket will never be creeped even if held at high temperature for a long period. Thus, the starting electric motor provided by the invention is high in reliability.

Also, according to the invention, the rear bracket has the buildup portions through which the through-bolts are extended, and the buildup portions are abutted against the conducting base. Therefore, the axial tensions of the through-bolts act on the rear bracket to compress the latter, and the resultant pressure is exerted on the conducting base. Furthermore, the metal plates will disperse the axial tensions, and prevent the parts of the rear end face of the rear bracket from being bent which are adjacent to the through-bolts. Thus, the invention can provide a starting electric motor having the resin rear bracket which is improved in mechanical strength and in creep resistance.

Further, according to the invention, the rear bracket of the DC motor is made of resin, and has the axial tension receiving parts, and the metal plate is interposed between the rear bracket and the yoke. Therefore, when the rear bracket is secured to the yoke with the through-bolts, the axial tensions of the through-bolts act directly on the yoke, and therefore the end wall of the rear bracket is never deformed, or bent, by the compression; that is, the rear bracket is suitably secured to the yoke.

Furthermore, in the starter device of the invention, the brush holders are mounted on the metal plate which is in contact with the yoke. Therefore, it is unnecessary to connect the lead wire to the negative brush holder to provide an earth circuit for the negative brush. This will contribute to a reduction of the number of components, and to simplification of the starter device manufacturing work.

What is claimed is:

1. A starting electric motor, comprising:
   armature means;
   armature rotary shaft means on which said armature means is mounted;
   commutator means mounted on the rear end portion of said armature rotary shaft means;
   brush means slidably held on said commutator means;
   brush holder means for holding said brush means;
   front bracket means;
   rear bracket means made of resin for rotatably supporting said armature rotary shaft means in association with said front bracket means;

yoke means including magnetic field means, which is fixedly held between said rear bracket means and said front bracket means;

conducting base means made of electrically conductive material held between said yoke means and said rear bracket means, said brush holder means being mounted on said conducting means, through-bolt means having a seat for integrally tightening said conducting base means and said yoke means through said rear bracket means and said front bracket means; and metal plate means provided between said seat of said through-bolt means and the outer surface of said rear bracket means, said metal plate means having major surface areas which are substantially larger in size than said seat of said through-bolt means such that axial tensions of said through-bolt means are dispersed and are not allowed to act locally on said rear bracket means.

2. A starting electric motor, comprising:
armature means;
armature rotary shaft means on which said armature means is mounted;
commutator means mounted on the rear end portion of said armature rotary shaft means;
brush means slidably held on said commutator means;
brush holder means for holding said brush means;
front bracket means;
rear bracket means made of resin for rotatably supporting said armature rotary shaft means in association with said front bracket means;
yoke means including magnetic field means, which is fixedly held between said rear bracket means and said front bracket means;
conducting base means made of electrically conductive material held between said yoke means and said rear bracket means, said brush holder means being mounted on said conducting means;
through-bolt means having a seat for integrally tightening said conducting base means and said yoke means through said rear bracket means and said front bracket means; and
metal plate means provided between said seat of said through-bolt means and the outer surface of said rear bracket means;
wherein said rear bracket means is provided with ribs at the rear end thereof, said metal plates being engaged with said ribs for preventing the displacement of said metal plates.

3. A starting electric motor, comprising:
armature means;
armature rotary shaft means on which said armature means is mounted;
commutator means mounted on the rear end portion of said armature rotary shaft means;
brush means slidably held on said commutator means;
brush holder means for holding said brush means;
front bracket means;
rear bracket means made of resin for rotatably supporting said armature rotary shaft means in association with said front bracket means;
yoke means including magnetic field means, which is fixedly held between said rear bracket means and said front bracket means;
conducting base means made of electrically conductive material held between said yoke means and said rear bracket means, said brush holder means being mounted on said conducting means;
through-bolt means having a seat for integrally tightening said conducting base means and said yoke means through said rear bracket means and said front bracket means; and
metal plate means provided between said seat of said through-bolt means and the outer surface of said rear bracket means;
wherein said metal plate means is formed of quenched band steel.

4. A starting electric motor, comprising:
armature means;
armature rotary shaft means on which said armature means is mounted;
commutator means mounted on the rear end portion of said armature rotary shaft means;
brush means slidably held on said commutator means;
brush holder means for holding said brush means;
front bracket means;
rear bracket means made of resin for rotatably supporting said armature rotary shaft means in association with said front bracket means;
yoke means including magnetic field means, which is fixedly held between said rear bracket means and said front bracket means;
conducting base means made of electrically conductive material held between said yoke means and said rear bracket means, said brush holder means being mounted on said conducting means;
through-bolt means having a seat for integrally tightening said conducting base means and said yoke means through said rear bracket means and said front bracket means;
metal plate means provided between said seat of said through-bolt means and the outer surface of said rear bracket means; and
buildup portion means formed on said rear bracket means at a part where said through-bolt means are extended for surrounding at least a part of said through-bolt means, the end of said buildup portion means on the side of said yoke means being abutted against said conducting base means.

5. A starting electric motor as claimed in claim 4, in which said metal plate means is integrally molded with said rear bracket means.

6. A starting electric motor, comprising:
an electric motor having a commutator and an armature;
yoke means forming a magnetic circuit and a housing of said electric motor, said yoke means having a rear open end thereof and a cylindrical wall thereof;
through-bolt means having a head with a seat; and
resin rear bracket of a cup-shape engaged with said rear open end of said yoke means and secured to said yoke means with said through-bolt means; and
said electric motor including metal plate means held between said rear open end of said yoke means and said rear bracket means, said metal plate means having a through-hole at a center thereof, said commutator being inserted into said through-hole; and axial tension receiving means integrally formed with said rear bracket along the inside of said cylindrical wall thereof, for surrounding at least a part of said through-bolt means in the circumferential direction thereof, said axial tension receiving means having one end which is flush with the end face of said cylindrical wall to contact with said metal plate means, and the other end which merges with the end wall of said rear bracket means.

7. A starting electric motor as claimed in claim 6, further comprising brush holder means for holding brush means, which is provided on said armature of said electric motor for rectification and mounted on said metal plate means.

8. A starting electric motor as claimed in claim 6 or 7, in which said metal plate means is integrally formed with said yoke means.

9. A starting electric motor as claimed in claim 6 or 7, in which said axial tension receiving means is larger than the seat of aid head of said through-bolt means.

10. A starting electric motor as claimed in claim 8, in which said axial tension receiving means is larger than the seat of said head of said through-bolt means.

11. A starting electric motor as claimed in claim 2 in which said metal plate means is formed of quenched band steel.

* * * * *